United States Patent
Baruch et al.

(10) Patent No.: US 12,353,718 B1
(45) Date of Patent: Jul. 8, 2025

(54) PERSISTENTLY STORING A TRANSACTION LOG IN A DATA STORAGE SYSTEM BASED ON A LOG POLICY

(71) Applicant: Dell Products L.P., Round Rock, TX (US)

(72) Inventors: Oran Baruch, Tel Aviv (IL); Vamsi K. Vankamamidi, Hopkinton, MA (US); Michael Litvak, Shoham (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/409,130

(22) Filed: Jan. 10, 2024

(51) Int. Cl.
G06F 3/06 (2006.01)

(52) U.S. Cl.
CPC .......... *G06F 3/0611* (2013.01); *G06F 3/0679* (2013.01); *G06F 3/0653* (2013.01)

(58) Field of Classification Search
CPC ..... G06F 3/0611; G06F 3/0679; G06F 3/0653
See application file for complete search history.

(56) References Cited

U.S. PATENT DOCUMENTS

| | | | |
|---|---|---|---|
| 6,131,094 A | 10/2000 | Gord | |
| 8,239,584 B1 * | 8/2012 | Rabe | G06F 3/0605 711/170 |
| 8,918,586 B1 * | 12/2014 | Todd | G06F 12/00 711/117 |
| 9,613,066 B2 | 4/2017 | Idicula et al. | |
| 10,567,855 B2 * | 2/2020 | Van De Groenendaal | H03M 7/4081 |
| 10,812,584 B2 | 10/2020 | Yang et al. | |
| 11,074,172 B2 | 7/2021 | Trika | |

\* cited by examiner

*Primary Examiner* — Kalpit Parikh
(74) *Attorney, Agent, or Firm* — BainwoodHuang (57) ABSTRACT

When a host I/O request is received, logging each transaction that is to be performed to process the host I/O request includes selecting from between a first persistent storage and a second persistent storage to identify the location to which the transaction is to be logged, and then logging the transaction to the selected location. The selection may be made based on a log policy indicating percentages of transactions to be logged to each of the first persistent storage and the second persistent storage. The percentages may be calculated periodically based on a dynamically measured performance characteristic of the first data storage, such as latency. All transactions for host I/O requests below a threshold minimum size, and/or all transactions for host I/O requests received while the current system throughput is below a minimum system throughput, may be logged to the first persistent storage.

13 Claims, 4 Drawing Sheets

PERSISTENTLY STORING A TRANSACTION LOG IN A DATA STORAGE SYSTEM BASED ON A LOG POLICY

TECHNICAL FIELD

The present disclosure relates generally to persistent storage of transaction logs in data storage systems.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

During operation, a data storage system may initially store the host data it receives into a transaction log. The entries in the transaction log are a temporally ordered representation of the transactions performed within the data storage system to process the host I/O requests received by the data storage system. The transaction log is stored in persistent storage. The transaction log can be used to recover from failure conditions. When the data storage system recovers from a failure that causes the contents of its memory to be lost, the entries in the log may be used to replay or undo specific transactions as needed, depending on the internal state of the transactions at the time of the failure, in order to ensure that the host data stored by the data storage system is in the same state as is understood by the hosts using the data storage system at the time of the failure.

SUMMARY

In the disclosed technology, multiple host I/O requests are received by a data storage system. Upon receipt of each one of the host I/O requests, for each transaction that is to be performed by the data storage system to process the host I/O request, the disclosed technology i) selects, between a first persistent data storage and a second persistent data storage, a location for logging the transaction, where the selecting is responsive to a log policy indicating a percentage of transactions to be logged to the first persistent data storage and a percentage of transactions to be logged to the second persistent data storage, and ii) logs the transaction to the selected location.

In some embodiments, the disclosed technology periodically calculates the percentage of transactions to be logged to the first persistent data storage and the percentage of transactions to be logged to the second persistent data storage based on at least one performance metric of the first persistent data storage.

In some embodiments, the disclosed technology periodically calculates an average latency of the first persistent data storage, and the at least one performance metric includes the most recently calculated average latency of the first persistent data storage.

In some embodiments, the disclosed technology sets a low watermark for average latency of the first persistent data storage, and the periodic calculation of the percentage of transactions to be logged to the first persistent data storage and the percentage of transactions to be logged to the second persistent data storage based on at least one performance metric of the first persistent data storage includes comparing the low watermark for average latency of the first persistent data storage to the most recently calculated average latency of the first persistent data storage, and increasing the percentage of transactions to be logged to the first persistent data storage in response to the most recently calculated average latency of the first persistent data storage being less than the low watermark for average latency of the first persistent data storage.

In some embodiments, the disclosed technology sets a high watermark for average latency of the first persistent data storage, and the periodic calculation of the percentage of transactions to be logged to the first persistent data storage and the percentage of transactions to be logged to the second persistent data storage based on at least one performance metric of the first persistent data storage includes comparing the high watermark for average latency of the first persistent data storage to the most recently calculated average latency of the first persistent data storage and decreasing the percentage of transactions to be logged to the first persistent data storage in response to the most recently calculated average latency of the first persistent data storage exceeding the high watermark for average latency of the first persistent data storage.

In some embodiments, the disclosed technology selects between the first persistent data storage and the second persistent data storage further in response to a size of each transaction. In such embodiments, the disclosed technology selects the first persistent data storage for logging each transaction that has a size less than a threshold minimum transaction size.

In some embodiments, the disclosed technology monitors a current system throughput for the data storage system. In such embodiments, the disclosed technology logs all transactions to the first persistent storage while the current system throughput is less than a threshold minimum system throughput.

In some embodiments, the first persistent storage is a Non-Volatile Random Access Memory (NVRAM), and the second persistent storage is at least one Solid State Drive (SSD).

The disclosed technology is integral to providing a practical technical solution to the problem of efficiently using multiple, different persistent storage options as locations to which different portions of a transaction log are stored within a data storage system. By checking the disclosed log policy as each host I/O request is received by the data storage system, the disclosed technology advantageously enables a different persistent storage location to be used to log each transaction that is to be performed within the data storage system to process the received host I/O request. The log policy may be modified periodically, enabling dynamically changing the specific percentages that are being used in order to reflect the current performance of the persistent storage options, e.g. the performance of the first persistent storage. Performance of the first persistent storage may change in terms of the latency of the first persistent storage, which changes in response to changes in the total load on the first persistent storage option. During time periods in which the load on the first persistent storage increases, the bandwidth limit of the first persistent storage may be reached, causing the latency of the first persistent storage to increase, as transactions being logged to the first persistent storage have to first be queued, and queue depths increase. Similarly, time periods during which the total load on the first persistent storage decreases below the bandwidth limit of the first persistent storage, the latency of the first persistent storage will decrease, as the queue depths decrease. Using the first persistent storage latency to calculate the percentages in the disclosed log policy for the first persistent storage and the second persistent storage advantageously enables the data storage system to direct a lower proportion of transaction log entries to the first persistent storage when the total load on the first persistent storage is high, and a higher proportion of transaction entries to the first persistent storage when the total load on the first persistent storage is low. By using the dynamically measured latency of the first persistent storage as the performance metric, the disclosed technology advantageously adapts the percentage of logging performed on the first persistent storage to accommodate the total usage of the first persistent storage within the data storage system. In addition, intrinsic performance characteristics of the first persistent storage may differ between different NVRAM configurations. Such intrinsic differences also contribute to the measured latency of the first persistent storage, and are therefore advantageously reflected in the percentages of the log policy.

The disclosed technology may also be embodied to preferentially log transactions to the first persistent data storage under certain circumstances. A preference for the first persistent data storage may be particularly advantageous when the second persistent data storage is some number of solid state drives, in order to avoid increasing wear on the solid state drives by writing received host data directly to the solid state drives. This may be especially important when in-line host I/O request processing by the data storage system delays compression and data deduplication of the host write data received in host I/O write requests until after the transactions to be performed to process those requests have been logged, resulting in the host data that is logged being uncompressed and un-deduplicated. The preference for logging to the first persistent data storage may be provided in embodiments that require that transactions below a predetermined minimum size all be logged to the first persistent data storage. The preference may also be provided in embodiments in which all transactions for host I/O requests that are received while the system throughput for the data storage system is less than a threshold minimum system throughput are logged to the first persistent data storage.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Embodiments will now be described with reference to the figures. The embodiments described herein are not limiting, and are provided only as examples, in order to illustrate various features and principles of the disclosed technology. The embodiments of disclosed technology described herein are integrated into a practical solution to the problem of efficiently using multiple, different persistent storage options as locations to which different portions of a transaction log are stored within a data storage system.

The disclosed technology operates with regard to each one of multiple host I/O requests received by a data storage system by, for each transaction that is to be performed by the data storage system to process the host I/O request, i) selecting, between a first persistent data storage and a second persistent data storage, a location for logging the transaction, where the selecting is responsive to a log policy indicating a percentage of transactions to be logged to the first persistent data storage and a percentage of transactions to be logged to the second persistent data storage, and ii) logging the transaction to the selected location. The first persistent storage may include or consist of a Non-Volatile Random Access Memory (NVRAM), and the second persistent storage may include or consist of at least one Solid State Drive (SSD).

The disclosed technology may periodically calculate the percentage of transactions to be logged to the first persistent data storage and the percentage of transactions to be logged to the second persistent data storage based on at least one performance metric of the first persistent data storage. The disclosed technology may periodically calculate an average latency of the first persistent data storage, and the at least one performance metric may include or consist of the most recently calculated average latency of the first persistent data storage.

The disclosed technology may set a low watermark for average latency of the first persistent data storage. The periodic calculation of the percentage of transactions to be logged to the first persistent data storage and the percentage of transactions to be logged to the second persistent data storage based on at least one performance metric of the first persistent data storage may include i) comparing the low watermark for average latency of the first persistent data storage to the most recently calculated average latency of the first persistent data storage, and ii) increasing the percentage of transactions to be logged to the first persistent data storage in response to the most recently calculated average latency of the first persistent data storage being less than the low watermark for average latency of the first persistent data storage.

The disclosed technology may set a high watermark for average latency of the first persistent data storage. The periodic calculation of the percentage of transactions to be logged to the first persistent data storage and the percentage of transactions to be logged to the second persistent data storage based on at least one performance metric of the first persistent data storage may include i) comparing the high watermark for average latency of the first persistent data storage to the most recently calculated average latency of the first persistent data storage and ii) decreasing the percentage of transactions to be logged to the first persistent data storage in response to the most recently calculated average latency of the first persistent data storage exceeding the high watermark for average latency of the first persistent data storage.

The disclosed technology may select between the first persistent data storage and the second persistent data storage further in response to a size of each transaction, and a threshold minimum transaction size, e.g. by selecting the first persistent data storage for logging any transaction having a size that is less than the threshold minimum transaction size.

The disclosed technology may monitor a current system throughput for the data storage system, and log all transactions to the first persistent storage while the current system throughput is less than a threshold minimum system throughput.

Figure 1:
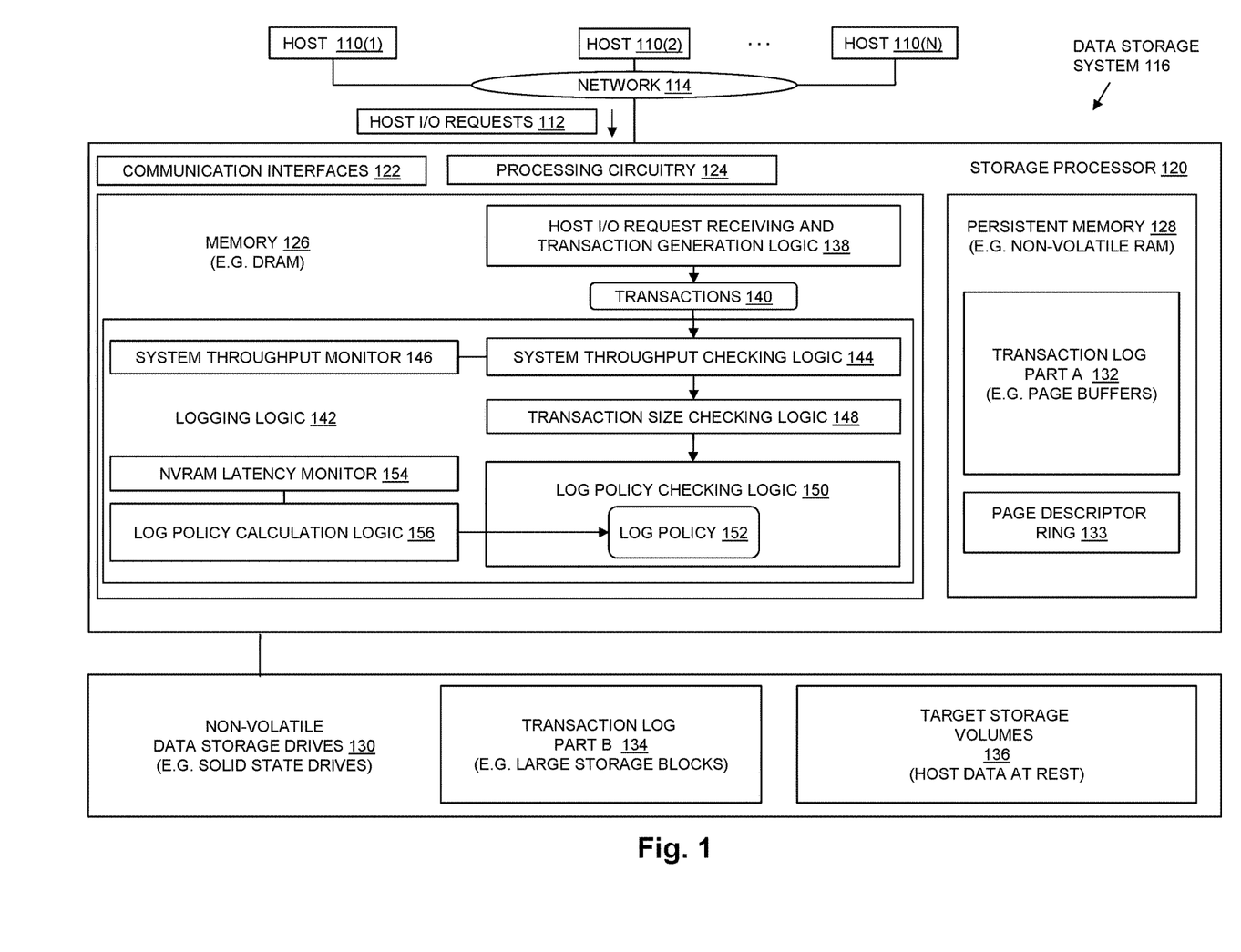
FIG. 1 is a block diagram showing an example of a data storage system including an illustrative embodiment of the disclosed technology.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 130, e.g. at least in part though one or more Communication Interfaces 122 of Storage Processor 120. No particular hardware configuration is required, and Storage Processor 120 may be embodied as any specific type of device that is capable of processing host input/output (I/O) requests (e.g. I/O read requests and I/O write requests, etc.), and of persistently storing host data.

The Physical Non-Volatile Data Storage Drives 130 may, for example, be embodied as solid state drives (SSDs), or alternatively as some other specific type of data storage drives. The Physical Non-Volatile Data Storage Drives 130 are an example of the "second persistent data storage" referred to herein.

A Memory 126 in Storage Processor 120 stores program code that is executed on Processing Circuitry 124, as well as data generated and/or processed by such program code. Memory 126 may include volatile memory (e.g. DRAM), and/or other types of memory.

Processing Circuitry 124 may include or consist of multiple processor cores, e.g. within one or more multi-core processor packages, each of which is made up of electronic circuitry that independently executes instructions, e.g. instructions within program code stored in Memory 126.

Processing Circuitry 124 and Memory 126 together form control circuitry that is configured and arranged to carry out various methods and functions described herein. The Memory 126 stores a variety of software components that may be provided in the form of executable program code, including Transaction Generation Logic 138 and Logging Logic 142. When the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

Storage Processor 120 further includes Persistent Memory 128. The contents of Persistent Memory 128 are not lost when power is turned off to the Storage Processor 120, as may occur suddenly and unexpectedly when Storage Processor 120 experiences a failure event. For example, Persistent Memory 128 may consist of or include Non-Volatile Random Access Memory (NVRAM). Persistent Memory 128 is an example of the "first persistent data storage" referred to herein.

During operation of the illustrative embodiment shown in FIG. 1, Host I/O Requests 112 are received by Host I/O Request Receiving and Transaction Generation Logic 138 in Storage Processor 120. For each received host I/O request, Host I/O Request Receiving and Transaction Generation Logic 138 determines the total number of transactions that are to be performed to completely process the host I/O request, and then generates those transactions. The transactions that are generated for a given host I/O write request are logged by the Storage Processor 120 in order to securely store the host data indicated by the host I/O write request. After all transactions generated for a given host I/O write request have successfully been logged, the host data to be written by that host I/O request has been securely stored, and Storage Processor 120 can issue an acknowledgement of completion of the host I/O write request to the host that issued the host I/O write request.

The specific number of transactions generated to process an individual received host I/O write request is determined based on i) a maximum transaction size, and ii) the size of the host data associated with the host I/O write request that is to be stored in Data Storage System 116, i.e. the size of the host data that is contained in or indicated by the host I/O write request. For each host I/O write request having a size that is less than a maximum transaction size, a single transaction is generated to store all of the host data indicated by the host I/O request. For example, for each host I/O write request that writes an amount of host data that is not greater than a maximum transaction size of 1 megabyte, a single transaction is generated to store all of the host data. The single transaction generated for each I/O write request having a size not greater than the maximum transaction size has a size equal to the size of the host I/O write request, e.g. a size equal to the amount of host data to be written by the host I/O write request.

For larger host I/O requests, i.e. for each of those host I/O write requests that write amounts of host data larger than the maximum transaction size, multiple transactions are generated. The host data is divided among the multiple transactions, each one of which has a size not greater than the maximum transaction size. For example, in the case of a host I/O write request that writes 1.5 megabytes of host data, two transactions are generated: i) a first transaction for storing 1 megabyte of the host data, having a size of 1 megabyte, and ii) a second transaction for storing the remaining 0.5 megabytes, having a size of 0.5 megabytes. Similarly, a host I/O write request that writes 4 megabytes of host data causes 4 transactions of 1 megabyte each to be generated. And in another example, a host I/O write request that writes 4.5 megabytes of host data would cause 4 transactions of 1 megabyte each and one transaction of 0.5 megabytes to be generated.

Each transaction generated by Host I/O Request Receiving and Transaction Generation Logic 138 is passed to Logging Logic 142, as shown by Transactions 140. As shown in FIG. 1, the transaction log includes Transaction Log Part A 132 in Persistent Memory 128, Transaction Log Part B 134 in Non-Volatile Data Storage Drives 130, and Page Descriptor Ring 133 in Persistent Memory 128. For each transaction, Logging Logic 142 selects a location for logging the transaction, from between Persistent Memory 128 (the "first" persistent storage) and Non-Volatile Data Storage Drives 130 (the "second" persistent storage). Logging Logic 142 then logs the host data for that transaction to the selected location. Specifically, Logging Logic 142 determines whether the host data associated with each transaction is to be logged to i) Transaction Log Part A 132 in Persistent Memory 128, or to ii) Transaction Log Part B 134 in Non-Volatile Data Storage Drives 130.

When Logging Logic 142 logs a transaction to Transaction Log Part A 132 in Persistent Memory 128, the host data for that transaction is stored into one or more page buffers that are allocated from Persistent Memory 128 to store host data within Transaction Log Part A 132. Each page buffer allocated to store host data in Transaction Log Part A 132 may, for example, be four kilobytes in size (4 KB). At least one page descriptor pointing to the page buffer(s) storing the host data is then added to the head of the Page Descriptor Ring 133.

When Logging Logic 142 logs a transaction to Transaction Log Part B 134 in Non-Volatile Data Storage Drives 130, the host data for that transaction is stored into a large storage block that is allocated from Non-Volatile Data Storage Drives 130 to store host data within Transaction Log Part B 134. Each large storage block allocated to store host data in Transaction Log Part B 134 may, for example, be two megabytes in size (2 MB). At least one page descriptor pointing to the host data within the large storage block storing the host data is then added to the head of the Page Descriptor Ring 133.

As shown by Page Descriptor Ring 133, a transaction log ring data structure is also stored in Persistent Memory 128. Page Descriptor Ring 133 is made up of page descriptors. Each page descriptor in Page Descriptor Ring 133 may include a pointer to one of the page buffers in Transaction Log Part A 132 that currently stores host data, or a pointer to a large storage block in Transaction Log Part B 134 that currently contains host data. For example, Page Descriptor Ring 133 may be a circular ring data structure. Page descriptors that contain pointers to newly stored host data are added at a head of the ring, as the host data is received and stored. Page descriptors are reclaimed for reuse at a tail of the ring, after the host data that they point to has been flushed to Target Storage Volumes 136 from Transaction Log Part A 132, or after the host data that they point to has been mapped to Target Storage Volumes 136 from where it was logged to Transaction Log Part B 134. The page descriptors in Page Descriptor Ring 133 are temporally ordered, based on the times at which the host data they indicate was received, such that page descriptors located more towards the head point to more recently received host data, while page descriptors located more towards the tail point to less recently received host data.

Target Storage Volumes 136 include one or more target storage volumes that are used to store host data after it is moved out of the transaction log, i.e. when the host data is "at rest". Host data received by Storage Processor 120 is stored in Target Storage Volumes 136 when it is flushed from Transaction Log Part A 132, and/or when it is mapped to the Target Storage Volumes 136 in the case where it was initially logged to Transaction Log Part B 134.

In some embodiments, System Throughput Monitor 146 may monitor the current system throughput of Data Storage System 116. For example, System Throughput Monitor 146 may periodically calculate the current system throughput with regard to the completed processing of host I/O write requests that were received by Storage Processor 120, e.g. over a preceding time period. A threshold minimum system throughput may also be stored in System Throughput Checking Logic 144. The threshold minimum system throughput may be set to a value that is less than the bandwidth of Persistent Memory 128. For example, in the case where the bandwidth of Persistent Memory 128 is 6 megabytes (6 MB), the threshold minimum throughput may be set to 5 megabytes (5 MB). In any time period during which the most recently calculated current system throughput is less than the threshold minimum system throughput, System Throughput Checking Logic 144 may cause Logging Logic 142 to log all transactions received by Logging Logic 142 to Transaction Log Part A 132 in Persistent Memory 128.

In some embodiments, for each one of the transactions generated while the most recently calculated current system throughput is not less than the threshold minimum system throughput, Transaction Size Checking Logic 148 may cause Logging Logic 142 to select between logging the transaction to Transaction Log Part A 132 in Persistent Memory 128 or to Transaction Log Part B 134 in Non-Volatile Data Storage Drives 130 based at least in part on the size of the transaction. During such time periods, Transaction Size Checking Logic 148 may cause Logging Logic 142 to select Transaction Log Part A 132 in Persistent Memory 128 for logging all transactions that have a size less than a threshold minimum transaction size. In embodiments in which Non-Volatile Data Storage Drives 130 are configured as a Redundant Array of Independent Disks (RAID), the threshold minimum transaction size may be equal to the stripe size of the RAID. Using the stripe size of the RAID as the threshold minimum transaction size promotes the use full stripe writes when logging host data to Non-Volatile Data Storage Drives 130, thereby avoiding the poor performance and SSD wear that may otherwise result from the large number of parity changes that would be caused by logging large numbers of smaller transactions to the Transaction Log Part B 134 in Non-Volatile Data Storage Drives 130.

As described above, in some embodiments, during time periods in which the most recently calculated current system throughput for Data Storage System 116 is less than the threshold minimum system throughput, transactions received by Logging Logic 142 may all be logged to Transaction Log Part A 132 in Persistent Memory 128. As also described above, during time periods in which the most recently calculated current system throughput for Data Storage System 116 is not less than the threshold minimum system throughput, all transactions received by Logging Logic 142 that have a size less than the threshold minimum transaction size may also be logged to Transaction Log Part A 132. Accordingly, in some embodiments, Log Policy Checking Logic 150 may only process that subset of all transactions in Transactions 140 that both i) are received by Logging Logic 142 in time periods during which the most recently calculated current system throughput for Data Storage System 116 is not less than the threshold minimum system throughput, and ii) have a size that is equal to at least the threshold minimum transaction size. Each one of the transactions in that subset of all generated transactions is processed by Log Policy Checking Logic 150. For each transaction that is processed by Log Policy Checking Logic 150, Log Policy Checking Logic 150 selects the location to which the transaction is to be logged by Logging Logic 142 from between the Transaction Log Part A 132 in Persistent Memory 128 and the Transaction Log Part B 134 in Non-Volatile Data Storage Drives 130 based on Log Policy 152. Log Policy 152 indicates or contains i) a percentage of the transactions that are processed by Log Policy Checking Logic 150 that are to be logged to Transaction Log Part A 132 in Persistent Memory 128, and ii) a percentage of the transactions that are processed by Log Policy Checking Logic 150 that are to be logged to Transaction Log Part B 134 in Non-Volatile Data Storage Drives 130. Accordingly, Log Policy 152 selects the Transaction Log Part A 132 in Persistent Memory 128 as the location to log a percentage of the transactions it processes that is equal to the percentage of transactions that are to be logged to Transaction Log Part A 132 in Persistent Memory 128 indicated by Log Policy 152, and selects the Transaction Log Part B 134 in Non-Volatile Data Storage Drives 130 as the location to log a percentage of the transactions it processes that is equal to the percentage of transactions that are to be logged to Transaction Log Part B 134 in Non-Volatile Data Storage Drives 130 indicated by Log Policy 152. Logging Logic 142 logs each transaction processed by Log Policy Checking Logic 150 to the logging location that is selected by Log Policy Checking Logic 150.

Log Policy Calculation Logic 156 may periodically calculate Log Policy 152, e.g. every 100 milliseconds. Log Policy Calculation Logic 156 may periodically calculate Log Policy 152 by periodically calculating i) the percentage of transactions that are to be logged to Transaction Log Part A 132 in Persistent Memory 128 indicated by Log Policy 152, and ii) the percentage of transactions that are to be logged to Transaction Log Part B 134 in Non-Volatile Data Storage Drives 130 indicated by Log Policy 152, based on at least one performance metric of Persistent Memory 128. In some embodiments, the performance metric used for the calculation of the percentages in Log Policy 152 may be a most recently calculated average latency of Persistent Memory 128. Other performance metrics may be used in addition, or in the alternative.

NVRAM Latency Monitor 154 may periodically calculate an average latency of Persistent Memory 128, e.g. every 100 milliseconds. For example, each time Persistent Memory 128 is accessed (e.g. to write host data to Persistent Memory 128), a first timestamp may be generated stored when the access is requested. When the access is completed (e.g. when an acknowledgement is received from Persistent Memory 128 indicating that the host data has been successfully stored in Persistent Memory 128), a second timestamp may be generated. The difference between the two timestamps is a measurement of the latency of Persistent Memory 128 for that access. A moving average latency of Persistent Memory 128 may then be calculated periodically by NVRAM Latency Monitor 154 using the latency measurements collected for accesses performed during the preceding time period.

In some embodiments, NVRAM Latency Monitor 154 is only activated during time periods in which the most recently calculated current system throughput for Data Storage System 116 is not less than the threshold minimum system throughput.

Log Policy Calculation Logic 156 may set a low watermark for average latency of the Persistent Memory 128. Periodic calculation by Log Policy Calculation Logic 156 of the percentage of transactions that are to be logged to Transaction Log Part A 132 in Persistent Memory 128 and the percentage of transactions that are to be logged to Transaction Log Part B 134 in Non-Volatile Data Storage Drives 130 based on the most recently calculated average latency of Persistent Memory 128 may include i) comparing the low watermark for average latency of Persistent Memory 128 to the most recently calculated average latency of Persistent Memory 128, and ii) increasing the percentage of transactions that are to be logged to Transaction Log Part A 132 in Persistent Memory 128 in response to the most recently calculated average latency of Persistent Memory 128 being less than the low watermark for the average latency of Persistent Memory 128. For example, under such circumstances, the percentage of transactions that are to be logged to Transaction Log Part A 132 in Persistent Memory 128 may be increased by a predetermined increment, e.g. by 10 percent. For example, in the case where the percentage of transactions that are to be logged to Transaction Log Part A 132 in Persistent Memory 128 was previously set to 60 percent, and the percentage of transactions that are to be logged to Transaction Log Part B 134 in Non-Volatile Data Storage Drives 130 was previously set to 40 percent, increasing the percentage of transactions that are to be logged to Transaction Log Part A 132 in Persistent Memory 128 by 10 percent results in the percentage of transactions that are to be logged to Transaction Log Part A 132 in Persistent Memory 128 being 70 percent, and the percentage of transactions that are to be logged to the Transaction Log Part B 134 in Non-Volatile Data Storage Drives 130 being 30 percent.

Log Policy Calculation Logic 156 may also set a high watermark for average latency of the Persistent Memory 128. Periodic calculation by Log Policy Calculation Logic 156 of the percentage of transactions that are to be logged to Transaction Log Part A 132 in Persistent Memory 128 and the percentage of transactions that are to be logged to Transaction Log Part B 134 in Non-Volatile Data Storage Drives 130 based on the most recently calculated average latency of Persistent Memory 128 may include i) comparing the high watermark for average latency of Persistent Memory 128 to the most recently calculated average latency of Persistent Memory 128, and ii) decreasing the percentage of transactions that are to be logged to Transaction Log Part A 132 in Persistent Memory 128 in response to the most recently calculated average latency of Persistent Memory 128 exceeding the high watermark for the average latency of Persistent Memory 128. For example, under such circumstances, the percentage of transactions that are to be logged to Transaction Log Part A 132 in Persistent Memory 128 may be decreased by a predetermined increment, e.g. by 10 percent. For example, in the case where the percentage of transactions that are to be logged to Transaction Log Part A 132 in Persistent Memory 128 was previously set to 70 percent, and the percentage of transactions that are to be logged to Transaction Log Part B 134 in Non-Volatile Data Storage Drives 130 was previously set to 30 percent, decreasing the percentage of transactions that are to be logged to Transaction Log Part A 132 in Persistent Memory 128 by 10 percent results in the percentage of transactions that are to be logged to Transaction Log Part A 132 in Persistent Memory 128 being 60 percent, and the percentage of transactions that are to be logged to the Transaction Log Part B 134 in Non-Volatile Data Storage Drives 130 being 40 percent.

Figure 2:
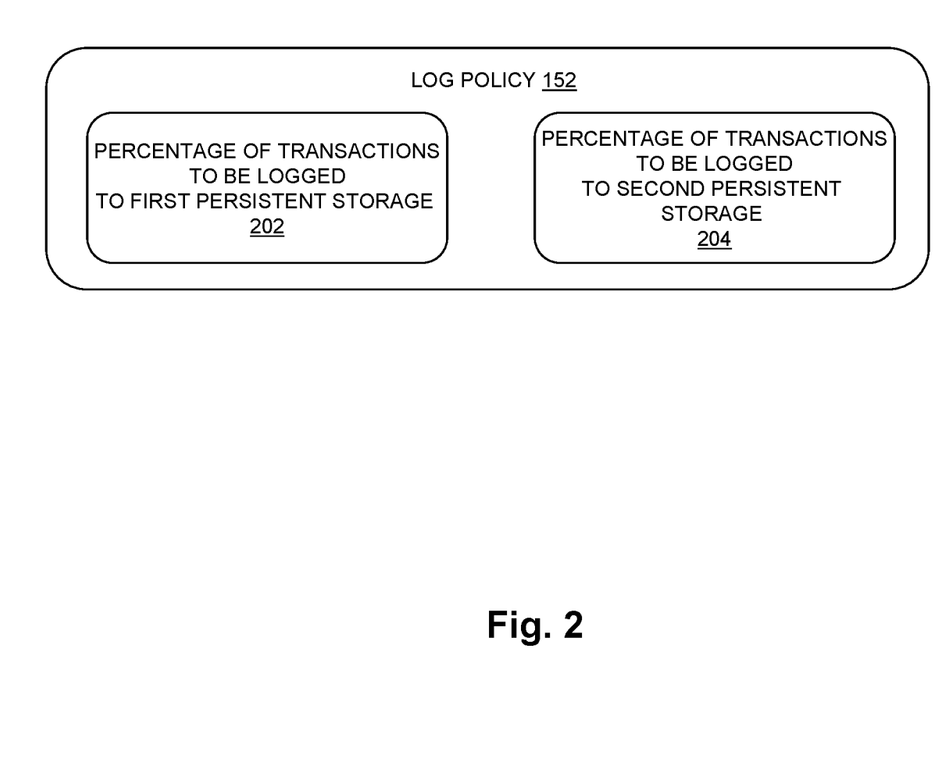
FIG. 2 is a block diagram showing an example of the disclosed log policy.

FIG. 2 is a block diagram showing an example of the disclosed log policy. As shown in FIG. 2, the Log Policy 152 includes Percentage of Transactions to be Logged to First Persistent Storage 202, which is a percentage of the transactions processed by Log Policy Checking Logic 150 that are to be logged to Transaction Log Part A 132 in Persistent Memory 128. Log Policy 152 also includes Percentage of Transactions to be Logged to Second Persistent Storage 204, which is a percentage of the transactions processed by Log Checking Logic 150 that are to be logged to Transaction Log Part B 134 in Non-Volatile Data Storage Drives 130.

Figure 3:
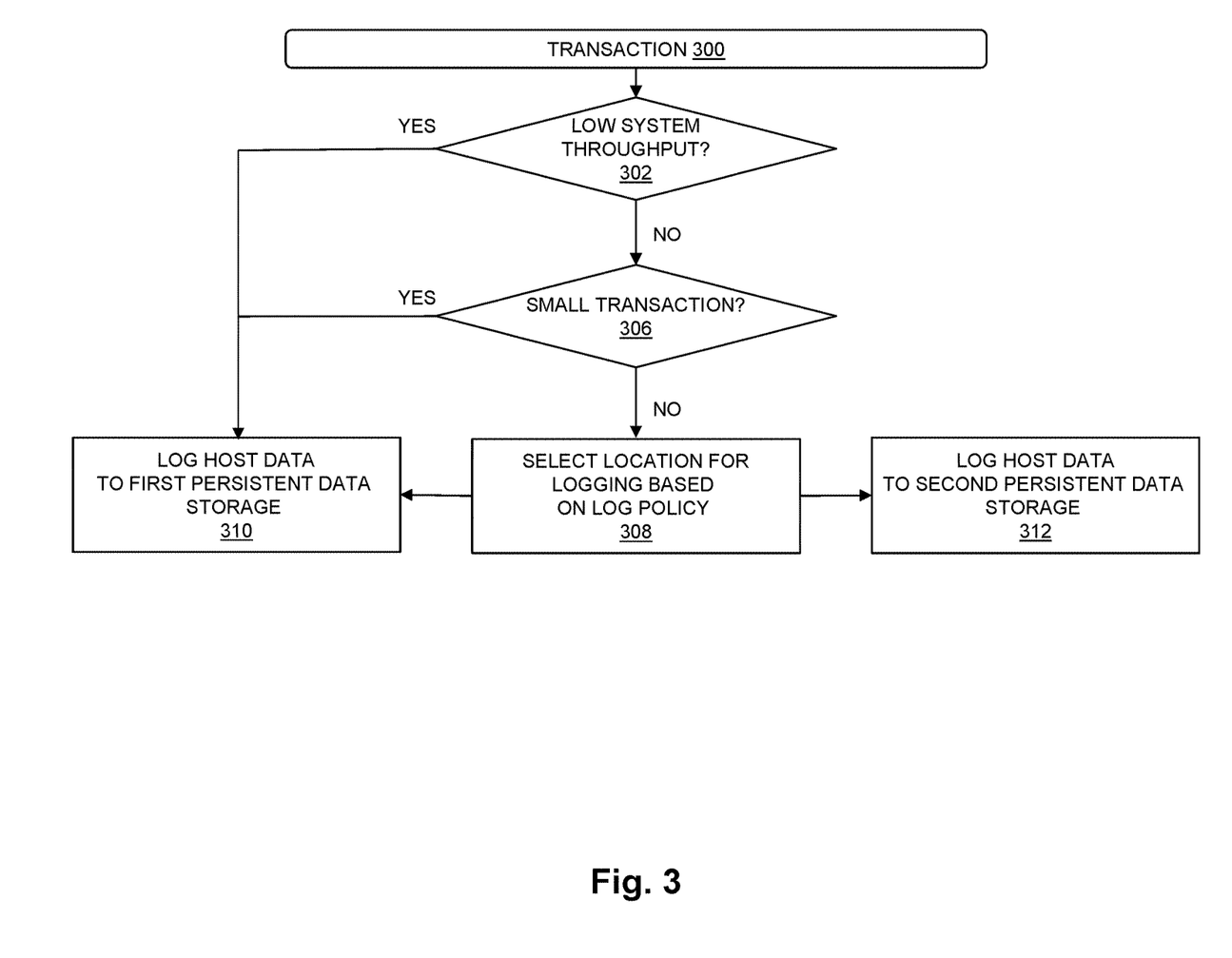
FIG. 3 is a flow chart showing an example of steps performed in some embodiments.

FIG. 3 is a flow chart showing an example of steps performed in some embodiments. The steps of FIG. 3 may, for example, be performed in some embodiments of Logging Logic 142 for a given transaction, e.g. a Transaction 300.

At step 302, the disclosed technology determines whether the throughput of the data storage system is currently low. For example, a current throughput of the data storage system (e.g. Storage Processor 120) may be compared to a predetermined threshold minimum system throughput. If the current throughput is less than the threshold minimum system throughput, then the throughput of the data storage system is currently low, and step 302 is followed by step 310, in which the host data associated with the transaction is logged to the first persistent storage (e.g. Transaction Log Part A 132 in Persistent Memory 128). Otherwise, step 302 is followed by step 306.

At step 306, the disclosed technology determines whether the host data associated with the transaction is relatively small. For example, a size of the transaction may be compared to a predetermined threshold minimum transaction size. If the size of the transaction is less than the threshold minimum transaction size, then the size of the host data associated with the transaction is relatively small, and step 306 is followed by step 310, in which the host data associated with the transaction is logged to the first persistent storage (e.g. Transaction Log Part A 132 in Persistent Memory 128). Otherwise, step 306 is followed by step 308.

At step 308, the disclosed technology selects a location for logging the host data associated with the transaction based on the log policy. For example, the location to which the transaction is to be logged is selected from between the Transaction Log Part A 132 in Persistent Memory 128 and the Transaction Log Part B 134 in Non-Volatile Data Storage Drives 130 based on Log Policy 152, such that the percentage of transactions logged to Transaction Log Part A 132 in Persistent Memory 128 is equal to the percentage of transactions to be logged to Transaction Log Part A 132 in Persistent Memory 128 indicated by Log Policy 152, and the percentage of transactions logged to Transaction Log Part B 134 in Non-Volatile Data Storage Drives 130 is equal to the percentage of transactions to be logged to Transaction Log Part B 134 in Non-Volatile Data Storage Drives 130 indicated by Log Policy 152. For example, if the percentage of transactions logged to Transaction Log Part A 132 in Persistent Memory 128 during a current time period is less than the percentage of transactions to be logged to Transaction Log Part A 132 in Persistent Memory 128 indicated by Log Policy 152, then step 308 is followed by step 310, in which the host data associated with the transaction is logged to Transaction Log Part A 132 in Persistent Memory 128. Otherwise, step 308 is followed by step 312, in which the host data associated with the transaction is logged to Transaction Log Part B 134 in Non-Volatile Data Storage Drives 130.

Figure 4:
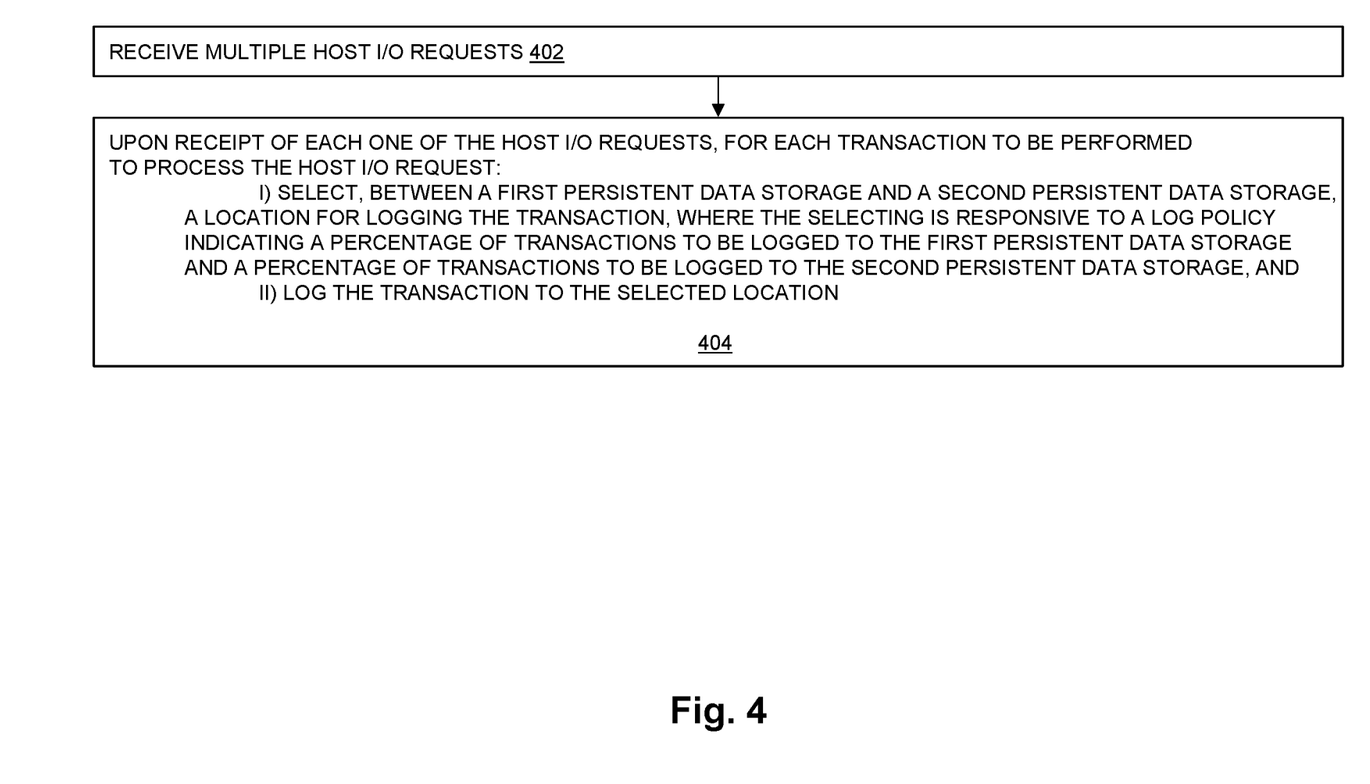
FIG. 4 is a flow chart showing another example of steps performed in some embodiments.

FIG. 4 is a flow chart showing another example of steps performed in some embodiments.

At step 402, the disclosed technology receives multiple host I/O requests.

At step 404, upon receipt of each one of the host I/O requests, for each transaction to be performed to process the host I/O request, the disclosed technology i) selects, between a first persistent data storage and a second persistent data storage, a location for logging the transaction, where the selecting is responsive to a log policy that indicates a percentage of transactions to be logged to the first persistent data storage and a percentage of transactions to be logged to the second persistent data storage, and ii) logs the transaction to the selected location.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
receiving a plurality of host I/O requests by a data storage system;
upon receipt of each one of the host I/O requests, for each transaction to be performed to process the host I/O request:
 selecting, between a first persistent data storage and a second persistent data storage, a location for logging the transaction, wherein the selecting is responsive to a log policy indicating a percentage of transactions to be logged to the first persistent data storage and a percentage of transactions to be logged to the second persistent data storage, and
 logging the transaction to the selected location;
periodically calculating an average latency of the first persistent data storage;
periodically calculating the percentage of transactions to be logged to the first persistent data storage and the percentage of transactions to be logged to the second persistent data storage based on at least one performance metric of the first persistent data storage; and
wherein the at least one performance metric includes a most recently calculated average latency of the first persistent data storage.

2. The method of claim 1, further comprising:
setting a low watermark for average latency of the first persistent data storage; and
wherein periodically calculating the percentage of transactions to be logged to the first persistent data storage and the percentage of transactions to be logged to the second persistent data storage based on at least one performance metric of the first persistent data storage includes comparing the low watermark for average latency of the first persistent data storage to the calculated average latency of the first persistent data storage and increasing the percentage of transactions to be logged to the first persistent data storage in response to the calculated average latency of the first persistent data storage being less than the low watermark for average latency of the first persistent data storage.

3. The method of claim 2, further comprising:
setting a high watermark for average latency of the first persistent data storage; and
wherein periodically calculating the percentage of transactions to be logged to the first persistent data storage and the percentage of transactions to be logged to the second persistent data storage based on at least one performance metric of the first persistent data storage includes comparing the high watermark for average latency of the first persistent data storage to the calculated average latency of the first persistent data storage and decreasing the percentage of transactions to be logged to the first persistent data storage in response to the calculated average latency of the first persistent data storage exceeding the high watermark for average latency of the first persistent data storage.

4. The method of claim 1, further comprising:
wherein the selecting between the first persistent data storage and the second persistent data storage is further responsive to a size of the transaction and a threshold minimum transaction size; and
selecting the first persistent data storage for transactions having a size less than the threshold minimum transaction size.

5. The method of claim 1, further comprising:
monitoring a current system throughput for the data storage system; and
logging all transactions to the first persistent storage while the current system throughput is less than a threshold minimum system throughput.

6. The method of claim 1, wherein the first persistent storage comprises a Non-Volatile Random Access Memory (NVRAM) and the second persistent storage comprises at least one Solid State Drive (SSD).

7. A data storage system comprising:
processing circuitry and a memory;
a first persistent data storage;
a second persistent data storage; and
wherein the memory has program code stored thereon, wherein the program code, when executed by the processing circuitry, causes the processing circuitry to:
 receive a plurality of host I/O requests,
 upon receipt of each one of the host I/O requests, for each transaction to be performed to process the host I/O request:
  select, between a first persistent data storage and a second persistent data storage, a location for logging the transaction, wherein the selecting is responsive to a log policy indicating a percentage of transactions to be logged to the first persistent data storage and a percentage of transactions to be logged to the second persistent data storage, and
  log the transaction to the selected location,
 periodically calculate an average latency of the first persistent data storage,
 periodically calculate the percentage of transactions to be logged to the first persistent data storage and the percentage of transactions to be logged to the second persistent data storage based on at least one performance metric of the first persistent data storage, and
 wherein the at least one performance metric includes a most recently calculated average latency of the first persistent data storage.

8. The data storage system of claim 7, wherein the program code, when executed by the processing circuitry, further causes the processing circuitry to:
set a low watermark for average latency of the first persistent data storage; and
wherein the periodic calculation of the percentage of transactions to be logged to the first persistent data storage and the percentage of transactions to be logged to the second persistent data storage based on at least one performance metric of the first persistent data storage includes comparing the low watermark for average latency of the first persistent data storage to the calculated average latency of the first persistent data storage and increasing the percentage of transactions to be logged to the first persistent data storage in response to the calculated average latency of the first persistent data storage being less than the low watermark for average latency of the first persistent data storage.

9. The data storage system of claim 8, wherein the program code, when executed by the processing circuitry, further causes the processing circuitry to:
- set a high watermark for average latency of the first persistent data storage; and
- wherein the periodic calculation of the percentage of transactions to be logged to the first persistent data storage and the percentage of transactions to be logged to the second persistent data storage based on at least one performance metric of the first persistent data storage includes comparing the high watermark for average latency of the first persistent data storage to the calculated average latency of the first persistent data storage and decreasing the percentage of transactions to be logged to the first persistent data storage in response to the calculated average latency of the first persistent data storage exceeding the high watermark for average latency of the first persistent data storage.

10. The data storage system of claim 7, wherein the program code, when executed by the processing circuitry, further causes the processing circuitry to:
- select between the first persistent data storage and the second persistent data storage further responsive to a size of the host I/O request and a threshold I/O request size; and
- select the first persistent data storage for logging transactions to be used to process the host I/O request in response to the size of the host I/O request being less than the threshold host I/O request size.

11. The data storage system of claim 7, wherein the program code, when executed by the processing circuitry, further causes the processing circuitry to:
- monitor a current system throughput for the data storage system; and
- log all transactions to the first persistent storage while the current system throughput is less than a threshold minimum system throughput.

12. The data storage system of claim 7, wherein the first persistent storage comprises a Non-Volatile Random Access Memory (NVRAM) and the second persistent storage comprises at least one Solid State Drive (SSD).

13. A computer program product including a non-transitory computer readable medium having instructions stored thereon, wherein the instructions, when executed on processing circuitry, cause the processing circuitry to perform steps including:
- receiving a plurality of host I/O requests by a data storage system;
- upon receipt of each one of the host I/O requests, for each transaction to be performed to process the host I/O request:
  - selecting, between a first persistent data storage and a second persistent data storage, a location for logging the transaction, wherein the selecting is responsive to a log policy indicating a percentage of transactions to be logged to the first persistent data storage and a percentage of transactions to be logged to the second persistent data storage, and
  - logging the transaction to the selected location;
- periodically calculating an average latency of the first persistent data storage;
- periodically calculating the percentage of transactions to be logged to the first persistent data storage and the percentage of transactions to be logged to the second persistent data storage based on at least one performance metric of the first persistent data storage; and
- wherein the at least one performance metric includes a most recently calculated average latency of the first persistent data storage.

* * * * *